United States Patent [19]

Shah

[11] Patent Number: 4,780,832

[45] Date of Patent: Oct. 25, 1988

[54] RADIATION PROBE AND METHOD OF USE

[75] Inventor: Nipulkumar G. Shah, Bristol, England

[73] Assignee: Rolls-Royce plc, London, England

[21] Appl. No.: 768,340

[22] Filed: Aug. 22, 1985

[30] Foreign Application Priority Data

Aug. 22, 1984 [GB] United Kingdom ................. 8421267

[51] Int. Cl.$^4$ ...................... G06F 15/74; G06F 15/46
[52] U.S. Cl. .................................... 364/494; 364/557; 374/36; 374/130
[58] Field of Search ............... 364/494, 505, 506, 557; 250/339; 73/35, 432 SD; 374/32, 36, 121, 134, 137, 144

[56] References Cited

U.S. PATENT DOCUMENTS

| | | | |
|---|---|---|---|
| 3,899,878 | 8/1975 | Compton et al. | 364/557 |
| 4,115,998 | 9/1978 | Gilbert et al. | 374/36 |
| 4,402,790 | 9/1983 | Lynn et al. | 374/130 |
| 4,463,260 | 7/1984 | Ikeda | 250/339 |
| 4,480,930 | 11/1984 | DeZubay et al. | 364/557 |
| 4,580,908 | 4/1986 | Stewen | 374/130 |

FOREIGN PATENT DOCUMENTS

| | | |
|---|---|---|
| 0030773 | 6/1981 | European Pat. Off. |
| 0081219 | 6/1983 | European Pat. Off. |
| 0778407 | 7/1957 | United Kingdom |
| 1221471 | 2/1971 | United Kingdom |
| 2042167 | 9/1980 | United Kingdom |
| 2127148 | 4/1984 | United Kingdom |

OTHER PUBLICATIONS

Norgen, Carl T., "Determination of Primary-Zone Smoke Concentrations from Spectral Radiance Measurements in Gas Turbine Combustors", Jul., 1971, NASA Technical Note, NASA TN D-6410, pp. 1-46.
Norgen, Carl T. et al., "Spectral Radiance Measurements and Calculated Soot Concentrations Along the Length of an Experimental Combustion", Apr., 1976, NASA Technical Memorandum, NASA TM X-3394, pp. 1-23.
F. C. Lockwood and N. G. Shah, "A New Radiation Solution Method for Incorporation in General Combustion Prediction Procedures", *The Combustion Institute*, 1981, pp. 1405–1414.
J. Inst. Fuel, vol. 35, 1962, The "Traversing" Method of Radiation Measurement in Luminous Flames.
Chapter 19—E. G. Hammond and J. M. Beer, Spatial Distribution of Spectral Radiant Energy in a Pressure Jet Oil Flame.
NASA Technical Memorandum 83538, Flame Radiation & Liner Heat Transfer in a Tubular-Can Combustor.
NASA Technical Paper 1722, Spectral Flame Radiance from a Tubular-Can Combustor.
NASA Technical Memorandum, Parametric Study of Flame Radiation Characteristics of a Tubular-Can Combustor.
72-WA/HT-29, an ASME Publication, Radiative Heat Transfer in Furnaces and Combustors.
Combustion Science & Technology, 1983, vol. 31, pp. 249–275, Temperature and Composition Measurements in a Research Gas Turbine Combustion Chamber.

*Primary Examiner*—Parshotam S. Lall
*Assistant Examiner*—Kevin J. Teska
*Attorney, Agent, or Firm*—Parkhurst & Oliff

[57] ABSTRACT

A radiation probe includes an optionally cooled tube 10 with a window 22 at one end, and can be traversed across a gas turbine engine combustion chamber 20 by drive means 26. A radiation detector 28 simultaneously measures radiation intensity at a plurality of wavelengths, at each of a succession of positions during the traverse. From this data, local values of radiation levels, grey and non grey absorption coefficients, local temperature and local gas composition and soot concentration are calculated, using a recurrence formula which relates intensities at neighboring positions.

10 Claims, 4 Drawing Sheets

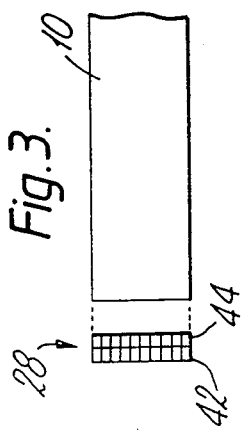
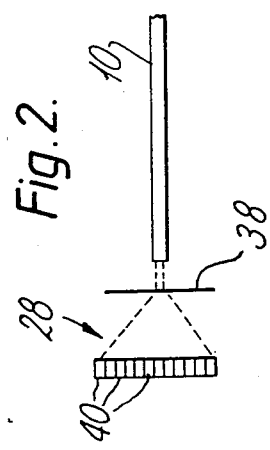
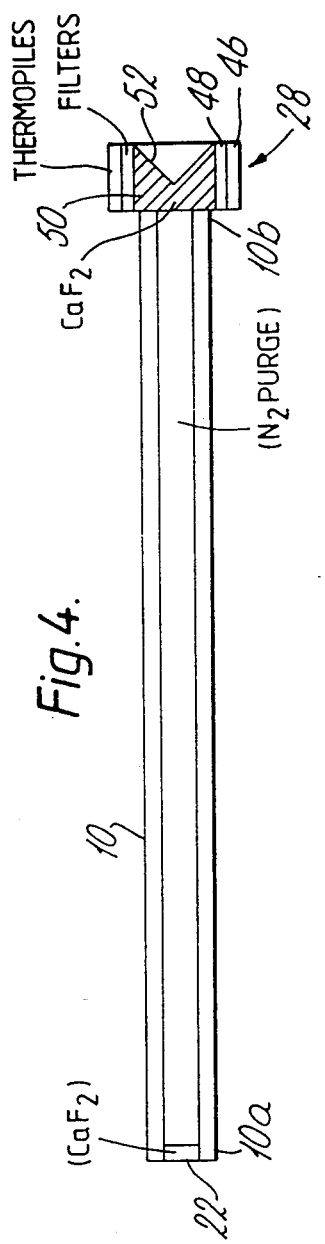
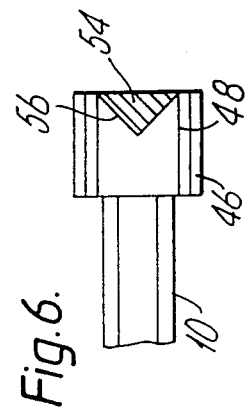

RADIATION PROBE AND METHOD OF USE

BACKGROUND OF THE INVENTION

This invention relates to devices for measuring radiation, and may be used for example in analyzing combustion processes, e.g., heat transfer in the combustion chambers of gas turbine engines.

The life and reliability of engine components, and in particular combustor walls, has always been a subject of a great deal of interest. The evaluation of combustor wall life is done by using various equations and empirical relations. A lot of this in turn depends on the temperatures of the walls. These temperatures are a consequence of various convective, conductive and radiative heat fluxes within the combustion gas. Therefore it is important both to be able to measure and to be able to model radiative heat transfer accurately.

The present modelling of radiative heat transfer requires input of absorption coefficients. An absorption coefficient is a function of wavelength, local gas temperature and gas composition, although the present modelling techniques use grey gas absorption coefficients (ones that do not depend on wavelength).

A known technique (the Schmidt method) for making radiation measurements in a combustion chamber uses a detector located outside a window in one wall of the combustion chamber and a background radiation source (a furnace) located in a line of sight outside a window in an opposite wall. A chopper is positioned in front of the radiation source to enable alternate measurements along the line of sight with the radiation source, and without it (i.e., measurement of just the emission from the combustion process). Since the radiation emitted by the furnace is known, this gives the proportion of radiation that is absorbed by the flame in the combustion chamber. This quantity is often known as absorbtivity of the flame. It is also possible to deduce radially weighted values of temperatures. The temperatures so determined are sometimes called Schmidt temperatures or brightness temperatures because they are not strictly temperatures. Norgen and Claus (NASA technical notes TN6410,1970; TMX-3394,1976; and technical paper 1722,1981) have used this technique with measurements in specific wavelength bands to determine smoke concentrations.

One major drawback of Schmidt type methods is that they give non-linearly weighted averages of unknown quantities across the width of the combustor, and local variations along the line of sight cannot be deduced. Moreover, on a test rig, there may not be two appropriately aligned holes in the combustor walls for the source and detector, so modification of the combustor may be required; and on a working gas turbine engine aligned holes are out of the question. Furthermore, the local gas composition cannot be deduced. Present gas analysis techniques involve taking gas samples, which is difficult to arrange without disturbing the combustion process.

It has also been proposed to measure temperature and soot concentration by traversing across a flame (Beer and Claus, "The traversing method of radiation measurement in luminous flames", J. Inst. Fuel, vol. 35 pp. 437–443, 1962). A development of this technique in which spectral measurements (i.e., measurements of radiation at a plurality of wavelengths) are made is described by Hammond and Beer, "Spatial Distribution of Spectral Radiant Energy in a Pressure Jet Oil Flame", Heat Transfer in Flames (Chapter 19), Scripta Book Co., 1974. In this technique, a sight tube from the source furnace is traversed across the flame, and averaged measurements are obtained along a line of sight from the position of the end of the sight tube in the flame to the detector. Thus, this technique still has the problems noted above of requiring a line of sight and of providing only averaged measurements (from the position of the end of the sight tube in the flame to the external detector). There is no correlation between measurements at different positions along the traverse of the sight tube.

SUMMARY OF THE INVENTION

In accordance with the present invention, intensity is measured at at least two neighboring local positions. Preferably spectral radiance (i.e., at a plurality of wavelengths) is measured at the neighboring positions, and used to determine local gas composition and temperature. The spectral measurements at a given position are preferably made simultaneously.

Each component (i) of the combustion gas has its own characteristic trace of absorption coefficient of the combustion gas $(K_{\lambda,i})$ for the wavelength spectrum at a given pressure and temperature. For a small volume of gas the total absorption coefficient $(K_\lambda)$ at wavelength $\lambda$, can be related:

$$K_\lambda = \Sigma_i C_i K_{\lambda,i} \qquad (1)$$

where $C_i$ is a proportional fraction of species i.

Let $I_{n,\lambda}$ be the intensity of radiation emitted and absorbed by gas at wavelength $\lambda$ at a local node n. Then using a method of analysis that is similar to the Discrete Transfer method one can obtain a recurrence relation:

$$I_{n+1,\lambda} = I_{n,\lambda} e^{-K_\lambda s} + \frac{C_1 \lambda^{-5}(1 - e^{-K_\lambda s})}{\pi(\exp(C_2/\lambda T) - 1)} \qquad (2)$$

where $I_{n+1,\lambda}$ is intensity at a neighboring node distance s away from the previous node at wavelength $\lambda$; $C_1$ and $C_2$ are First and Second Radiation constants; and T is the temperature. Hence by measuring intensities at two neighboring nodes at various selected wavelengths, one can obtain T from the measurement at one of the wavelengths and the $K_{80}$ for the rest of the wavelengths from the above recurrence relation. One can also use this relation over the whole spectrum and obtain the grey gas absorption coefficients.

Each of these $K_\lambda$'s can then be used in equation 1 to obtain a system of simultaneous equations. Given known values of $K_{\lambda,i}$ for each species i, it is then possible to calculate the gas composition.

Equation (2) above can be simplified to give the following relationship for "grey" radiation (i.e., over a broad band of wavelengths):

$$I_{n+1} = I_n e^{-Ks} + \frac{\sigma T^4}{\pi}(1 - e^{-Ks}) \qquad (3)$$

where K is the "grey" absorption coefficient given by $$K = \int K_\lambda d\lambda \qquad (4)$$

and $\sigma$ is Stefan's constant.

Using the simplified recurrence relation (3) therefore, even "grey" (i.e., non-spectral) measurements of radiation at neighboring nodes n and n+1 (separated by distance s) can yield useful results.

The present invention also provides a device for marking measurements on combustion gases in a combustion process, comprising:

a probe having at least one sensor for measuring the intensity of the radiation from the combustion process;

means for moving the probe, whereby the probe can traverse a path within the combustion gases, said path including a first position and a second position adjacent thereto; and data acquisition means for taking intensity measurements from the probe at each said position.

Such a device can then be used to make measurements in the manner described above.

BRIEF DESCRIPTION OF THE DRAWINGS

In order that the invention may be better understood, preferred embodiments will now be described with reference to the accompanying schematic drawings, wherein:

FIGS. 2 and 3 show two alternative detector arrangements for use in the probe of FIG. 1;

FIGS. 4 and 5 are a longitudinal section and an end view of a probe with a further alternative detector arrangement;

FIG. 6 shows a modification of FIGS. 4 and 5;

DESCRIPTION OF THE PREFERRED EMBODIMENTS

Figure 1:
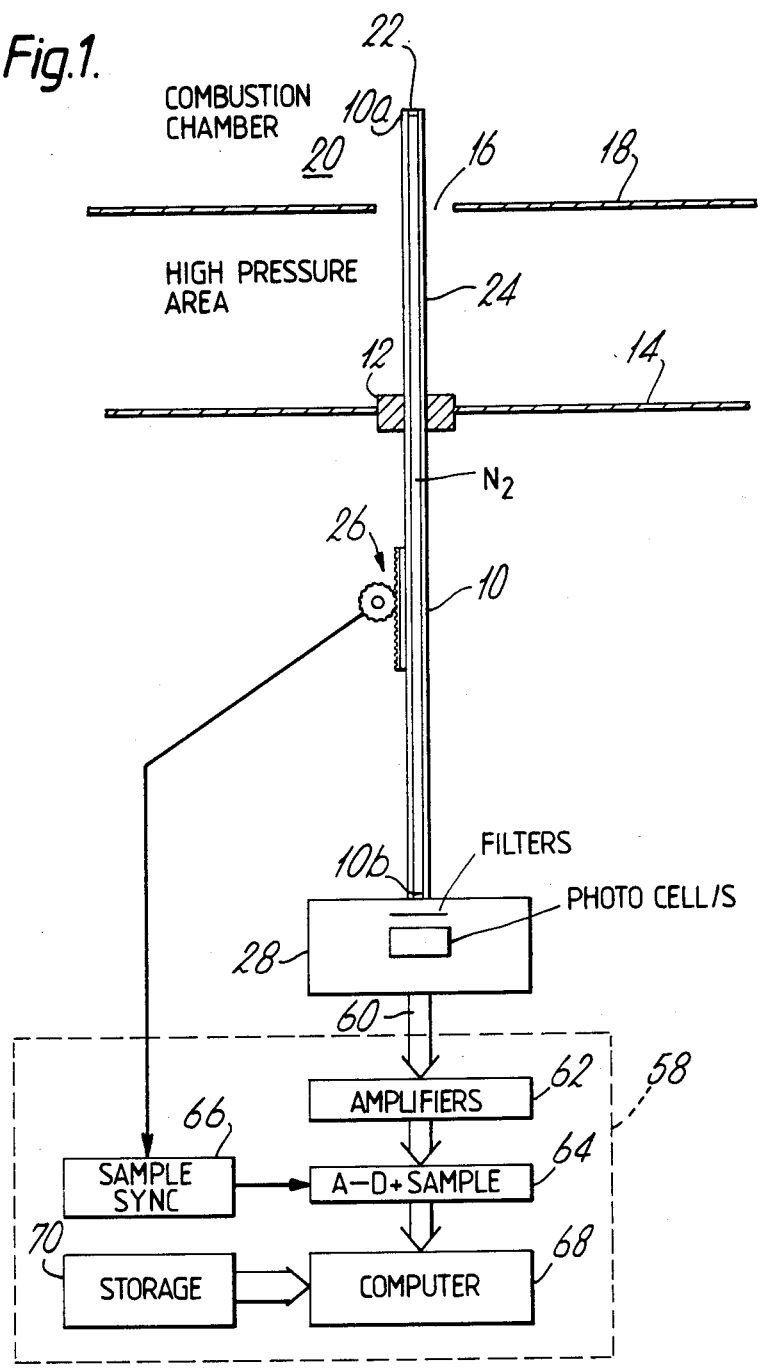
FIG. 1 shows a probe arrangement.

The example probe shown in FIG. 1 comprises an elongate sight tube 10, made of a material capable of withstanding the temperature and pressures of a gas turbine engine combustion chamber. A suitable material is SiC sold under the trade name Refel. The tube 10 passes slidingly through a seal 12 in an outer combustor casing 14, and through an air bleed hole 16 in an inner combustor wall 18, so that an inner end 10a of the tube 10 is transversable across a combustion chamber 20, and an outer end 10b is located outside the engine.

The tube 10 has a calcium fluoride window 22 at its inner end 10a and also possibly at its outer end 10b. The tube may be evacuated or may contain nitrogen gas (which has satisfactory radiation transmitting properties). The tube may have an outer sleeve 24 for circulation of a cooling fluid, or the outer end 10b may be connected to a cooling nitrogen gas supply, so that the nitrogen contents are purged into the interior of the combustion chamber. In the latter case, the window 22 may not be necessary, but there could be a risk of the nitrogen purge disturbing the combustion process to be studied.

In order that the inner end 10a of the tube 10 can traverse the combustion chamber, drive means 26 are provided. Schematically this is illustrated in FIG. 1 as a rack and motorized pinion, and a stepper motor is preferred since this gives accurate control of position during the traverse. The speed of the traverse depends on factors such as flame temperature. Alternative drive means are of course possible, for example a hydraulic piston and cylinder, preferably with a transducer to indicate position during the traverse. It will be appreciated that an accurate knowledge of the position of the tube end 10a is desirable if one is to measure localized conditions within the combustion chamber. The traverse path would normally be radial, but any other path which it is desired to study can be chosen. While the entire tube 10 is illustrated as being movable in FIG. 1, it would be possible to devise a telescopic arrangement whereby the inner end 10a traverses the combustion chamber while the outer end 10b remains stationary.

The outer end 10b of the tube 10 is provided with a radiation detector 28 which is capable of measuring intensities of radiation transmitted along the tube 10, simultaneously at a plurality of different wavelengths. This is done at a plurality of different positions along the traverse path of the end 10a. The wavelengths detected are typically in the range of 0.3 to 12 $\mu$m, though wavelengths outside this range are not excluded. FIG. 2 illustrates a simple detector arrangement for achieving this.

The incoming radiation from the tube 10 is split into different wavelengths by a diffraction grating or prism at 38, and directed at an array of photo-sensors 40. In this way, each sensor 40 receives radiation of a unique wavelength and produces a corresponding output. A reading is taken simultaneously from each sensor 40 at each of a plurality of positions during a single traverse.

The same effect is achieved by the arrangement of FIG. 3. Here, the incoming radiation passes to an array of sensors 42, each of which has an individual filter 44 making it sensitive to a specific wavelength. The sensors 42 and filters 44 could be individual miniature detectors, or could all be integrated on one semiconductor chip.

The arrangement of FIG. 2 has the disadvantage that the detectors need to be spaced to suit the wavelengths to be detected, and so a compact arrangement may not be possible. On the other hand, the arrangement of FIG. 3 requires the use of very small detectors, which is difficult to achieve at present. FIGS. 4 and 5 show an arrangement which overcomes these problems. Thermopile detectors 46, each made sensitive to a chosen wavelength by an individual filter 48 in front of it, are arranged circumferentially around a circular cross-section prism 50 at the end 10b of the tube 10. The prism 50 shown is cylindrical, but the outer face of the prism 50 has an internally conical surface 52, and the angle of the cone is chosen so that incoming radiation from the tube 10 suffers internal reflection at the surface 52 and is reflected equally on to each of the surrounding detectors. In this way, it is easy to arrange, for example, twelve detectors in the minimum possible space. As an alternative, FIG. 6 shows a cone 54 with a reflecting outer conical surface 56, which reflects the incoming radiation to the detectors 46. Instead of a reflecting cone 54, a reflecting hemisphere or pyramid (with as many sides as there are detectors) could be used; and the surface 52 in FIG. 4 could likewise be hemispherical or pyramidal.

The arrays of detectors and filters in FIGS. 4 to 6 are cylindrical and the angle of the reflecting conical surface to the incoming radiation is 45°. This ensures that the radiation is incident on the filters in the direction normal to their surface. The importance of this is that the calibration of such filters is only accurate for radiation incident normally. If the angle of the conical surface is other than 45° (e.g., to ensure total internal reflection), the array of detectors and filters (and the adjacent external surface of the prism) should be in the form of a cone, of an angle to ensure normal incidence. Where a hemispherical or pyramidal reflecting surface is used, the external surface of the prism, and the receiving surfaces of the filters taken together, are likewise hemishperical or pyramidal (with faces at an appropriate angle to the tube 10 to ensure normal incidence). It will be seen that the advantage of a pyramidal arrangement is that the surfaces of the filters do not need to be concave in the circumferential direction to ensure adherence to their calibration.

The detector 28 in any of the above arrangements is connected by cables 60 to a remote signal processor 58 (FIG. 1) which includes an amplifying circuit 62 and an analogue-to-digital converter and sampling circuit 64. This automatically takes a batch of readings from the detector 28 at a succession of adjacent positions throughout the traverse, synchronized with the motion of the tube 10 by a circuit 66 so that the positions at which the readings are taken are known. At each position, there is a simultaneous reading for each wavelength of interest. The readings can be stored, e.g., on magnetic tape, for subsequent processing by a computer 68 or such processing can take place in real time if adequate computing power is available. If desired, the amplifying circuit 62, the analogue-to-digital converter and sampling circuit 64 and the synchronizing circuit 66 could be located with the detector 28.

Figure 7:
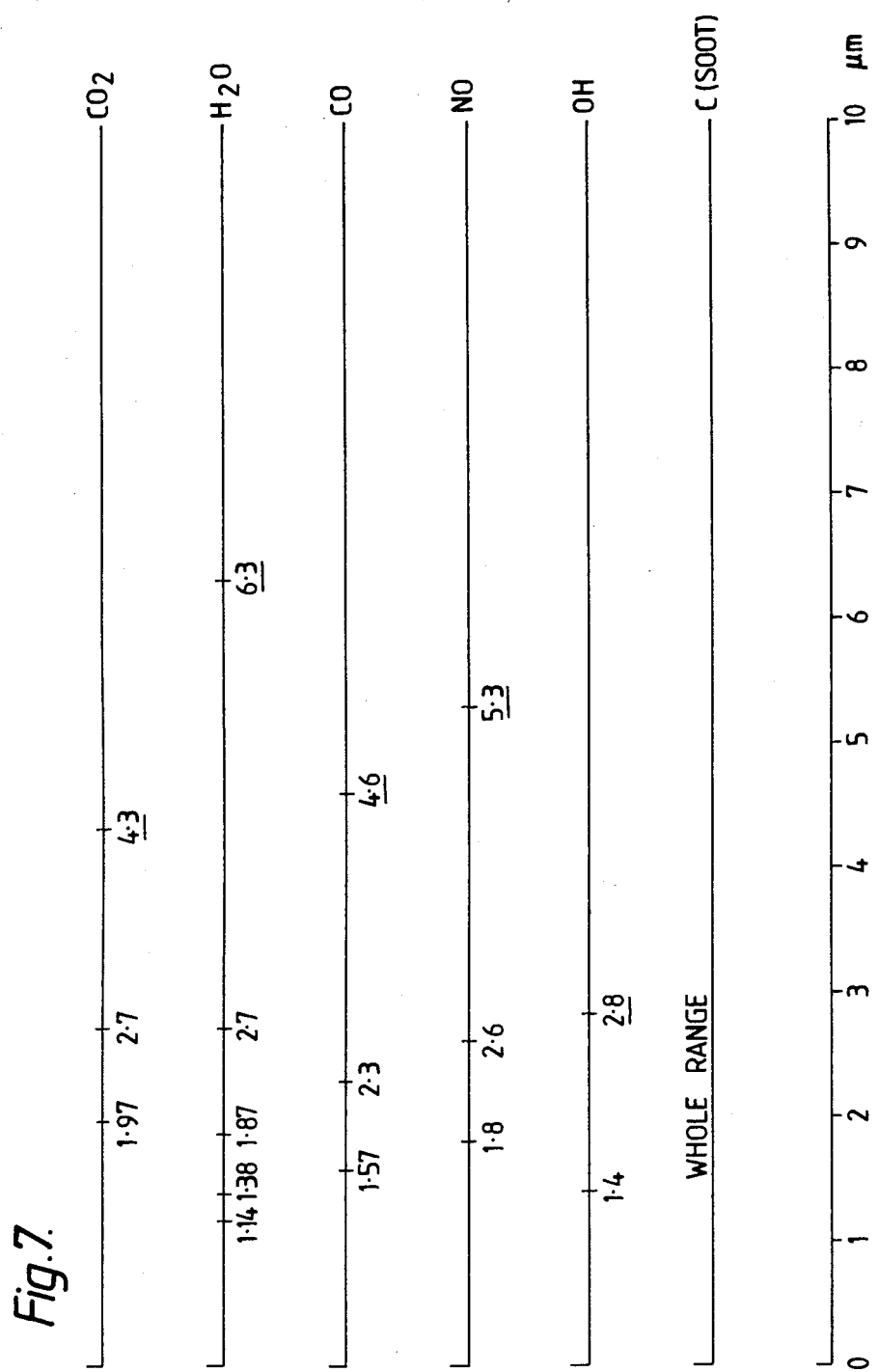
FIG. 7 shows in graphical form characteristic wavelengths of various typical combustion gas constituents.

The readings obtained for a given pair of neighboring locations are processed by the computer in accordance with the dispersion above relating to equations (1) and (2). Soot emits and absorbs throughout the spectrum. But the gaseous species have specific wavelengths that are predominant. This is illustrated in graphical form for various typical species in FIG. 7, but these values are not exhaustive, and the required data includes the absorption coefficients $K_{\lambda,i}$ at each wavelength for the various pure species at the pressures and temperatures of the combustion gas. More complete data is given in a NASA handbook by C. B. Ludwig et al, "Handbook of Infra-red Radiation from Combustion Gases", NASA SP3080, 1973 (which is incorporated herein by reference), or may be specifically measured in advance for each pure species encountered in the combustion gases. However obtained, these values of $K_{\lambda,i}$ are loaded into a database held in computer storage 70. A simple illustration of the processing performed is as follows.

One can find two 'clear' wavelengths where only soot effects are important. Applying equation (2) and then (1), one can solve for $C_{soot}$ (the local proportional fraction of soot in the combustion gases) and local temperature T simultaneously. Other wavelengths can then be analyzed taking $C_{soot}$ and T as known quantities. Hence $C_{O2}$ $C_{H2O}$ and $C_{co}$ are obtained. The local concentrations of each species are useful by-products of this approach. Hence one can get local absorption coefficients for each wavelength. This processing is repeated for other locations. The practical use of this procedure is as follows.

Figure 8:
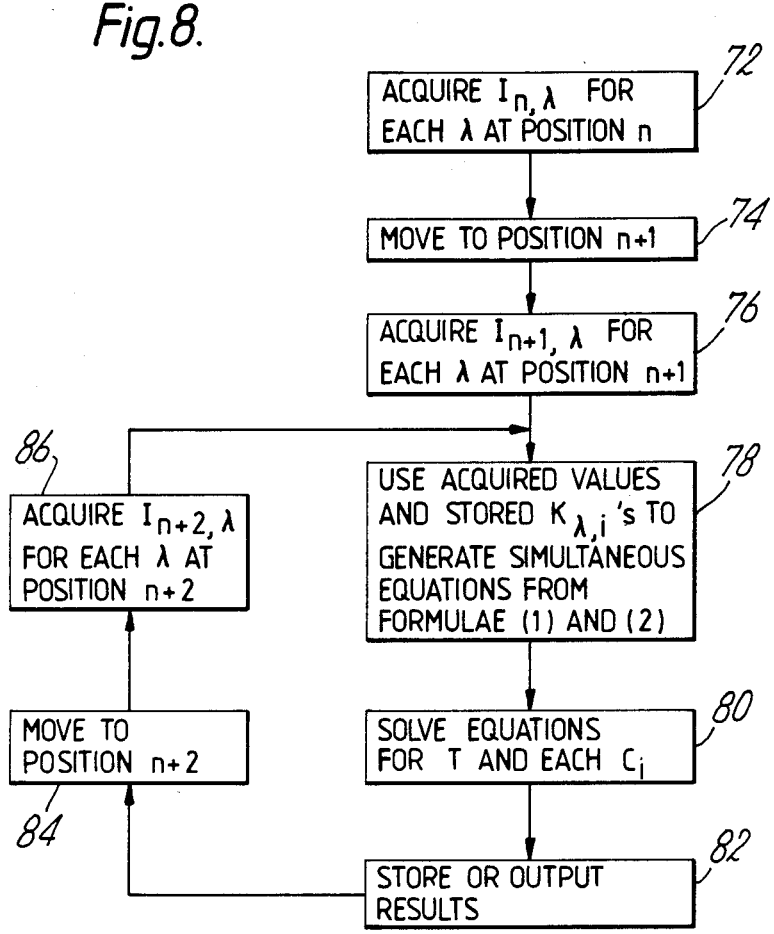
FIG. 8 is a flowchart of a computer program for use with the probe.

In use, the probe 10 is caused to traverse the combustion chamber, and the computer 68 is programmed as shown in FIG. 8 (which assumes the results are to be calculated in real time). Firstly, at step 72, values of $I_{n,\lambda}$ are simultaneously measured for the various wavelengths $\lambda$ at a first, known position n of the probe 10, using the various sensors in the detectors 28. Next, the detector is allowed to continue its traverse to the adjacent known position n+1 (step 74). Here, corresponding values of $I_{n+1,\lambda}$ are acquired (step 76). The computer now uses these acquired intensity values, the known distance s from n to n+1 and the stored values of $K_{\lambda,i}$ from the storage 70 to generate a system of simultaneous equations from formulae (1) and (2) above (step 78). It then proceeds to solve these equations for the local temperature T and the local concentrations $c_i$ of each species present in the vicinity of positions n and n+1 (step 80). These results can be output or stored for later use (step 82). Meanwhile, the probe 10 is moving to the next adjacent position n+2 (step 84) where the process of acquiring intensity values $I_{n+2,\lambda}$ is repeated (step 86). Steps 78, 80 and 82 are now repeated on the values $I_{n+1,\lambda}$ and $I_{n+2,\lambda}$ thus obtaining values of T and $C_i$ in the vicinity of positions n+1 and n+2. This process is repeated at successive probe positions throughout the traverse of the combustion chamber.

It will be appreciated that, should insufficient computing power be available for this real time approach, the acquired intensity values at each position of the traverse may simply be recorded on magnetic tape or some other medium. Steps 78, 80 and 82 are then performed subsequently on the recorded data.

If desired, a simplified probe and processing procedure may be used. The detector 28 contains only one sensor, sensitive to a band of wavelengths (i.e., "grey" radiation). At steps 72 and 76 in FIG. 8, grey intensities $I_n$ and $I_{n+1}$ are acquired, and at step 78 formulae (3) and (4) are used instead of formulae (1) and (2). It will be appreciated that one can only solve for T at step 80 if a theoretical estimation of the value of K has previously been made.

I claim:

1. A method of making measurements on combustion gases in a combustion process taking place in a combustion chamber, comprising the steps of:

inserting a measuring probe into the combustion chamber through a side wall of the chamber, making a first intensity measurement of radiation from the combustion process at a first axial position of the probe within the combustion chamber, to provide a first intensity value, making a second intensity measurement of radiation from the combustion process at a second axial position of the probe within the combustion chamber, said second position being spaced apart from the first position by a small axial distance, to provide a second intensity value, measuring the axial distance between the first and second measurement positions, producing signals representative of the first and second intensity measurements and a signal representative of the axial distance between the first and second measurement positions, and supplying said signals to a data processing means arranged to calculate a value for a local temperature for the combustion gases in the vicinity of the first and second measurement positions by using said measurements to evaluate a recurrence formula of the form:

$$I_{n+1} = I_n e^{-Ks} = \frac{\sigma T^4}{\pi}(1 - e^{-Ks})$$

wherein $I_n$ and $I_{n+1}$ are respectively the first and second intensity measurement, s is the axial distance between said first and second measurement positions, $\sigma$ is Stefan's constant, K is a gas absorption coefficient and T is the local temperature of the gas.

2. A method of making measurements on combustion gases in a combustion process taking place in a combustion chamber, comprising the steps of:

inserting a measuring probe into the combustion chamber through a side wall of the chamber, making a plurality of intensity measurements of radiation from the combustion process over a range of radiation wavelengths at a first axial position of the probe within the combustion chamber, to provide a first set of intensity values, making a second plurality of intensity measurements of radiation from the combustion process over a range of radiation wavelengths at a second axial position of the probe within the combustion chamber, said second position being spaced apart from the first position by a small axial distance, to provide a second set of intensity values, measuring the axial distance between the first and second measurement positions, producing signals representative of the first and second intensity measurements and a signal representative of the axial distance between the first and second measurement positions, and supplying said signals to a data processing means arranged to calculate a value for a local temperature for the combustion gases in the vicinity of the first and second measurement positions by using said measurements to evaluate a recurrence formula of the form:

$$I_{n+1,\lambda} = I_{n,\lambda}e^{-K\lambda s} + \frac{C_1\lambda^{-5}(1 - e^{-K\lambda s})}{\pi(\exp(C_2/\lambda T) - 1)}$$

wherein $I_{n,\lambda}$, $I_{n+1,\lambda}$ are first and second intensity values at a wavelength $\lambda$, s is the distance between said first and second positions, $K_\lambda$ is the total local absorption coefficient of the gas at the wavelength $\lambda$, T is said local temperature, and $C_1$ and $C_2$ are first and second radiation constants;

wherein $K_\lambda$ is given by $$K_\lambda = \Sigma_i C_i I_{\lambda,i}$$

in which $C_i$ is the total proportional fraction of a component species i in the gas, and $K_{\lambda,i}$ is the absorption coefficient of that species at the wavelength $\lambda$; and whereby a set of simultaneous equations is generated and is solved to calculate a value for the local gas temperature.

3. A method according to claim 2, wherein the set of simultaneous equations is solved to give values of $C_i$ as well as T.

4. Apparatus for making measurements, said apparatus comprising:

probe means for insertion axially into a combustion chamber through the side wall thereof, the probe means having a distal end which, in use, is located at a measurement position within the combustion chamber, a radiation receiving window being defined in the distal end of the probe means to receive radiation emitted by combustion gases within the chamber, at least one radiation sensing means located in radiation receiving relationship with said window, said at least one radiation sensing means being responsive to the intensity of incident radiation to produce a sensor output signal in accordance with the intensity of the incident radiation, drive means for moving the probe means axially so that the distal end of the probe means can be positioned on a path across the combustion chamber for making radiation intensity measurements at first and second positions on said path, position measuring means arranged to produce a position output signal representative of the distance between the first and second measurement positions on the path, data acquisition means connected to receive the at least one sensor output signal at each of said first and second positions and the position output signal, and to provide first and second intensity values and a distance value, and data processing means connected to receive said intensity and distance values and arranged to use said values to evaluate a recurrence formula of the form:

$$I_{n+1} = I_n e^{-Ks} + \frac{\sigma T^4}{\pi}(1 - e^{-Ks})$$

wherein $I_n$ and $I_{n+1}$ are respectively the first and second intensity measurement, s is the axial distance between said first and second measurement positions, $\sigma$ is Stefan's constant, K is a gas absorption coefficient and T is the local temperature of the gas.

5. Apparatus according to claim 4, wherein the probe means comprises an elongate radiation transmitting member, at least one end of which is movable by the drive means for moving the probe means and the opposite end of which is in radiation transmitting relationship with at least one radiation sensor.

6. Apparatus for making measurements, said apparatus comprising:

probe means for insertion axially into a combustion chamber through the side wall thereof, the probe means having a distal end which, in use, is located at a measurement position within the combustion chamber, a radiation receiving window being defined in the distal end of the probe means to receive radiation emitted by combustion gases within the chamber, a plurality of radiation sensing means located in radiation receiving relationship with said window, each said radiation sensing means being sensitive to a different wavelength, said plurality of radiation sensing means being responsive to the intensity of incident radiation to produce a plurality of sensor output signals over a range of radiation wavelengths in accordance with the intensity of the incident radiation, drive means for moving the probe means axially so that the distal end of the probe means can be positioned on a path across the combustion chamber for making radiation intensity measurements at first and second positions on said path, position measuring means arranged to produce a position output signal representative of the distance between the first and second measurement positions on the path, data acquisition means connected to receive substantially simultaneously said plurality of sensor output signals at each of said first and second positions, and the position output signal, to provide a first and second set of intensity values and a distance value, and data processing means connected to receive said intensity and distance values and arranged to use said values to evaluate a recurrence formula of the form:

$$I_{n+1,\lambda} = I_{n,\lambda}e^{-K_\lambda s} + \frac{C_1\lambda^{-5}(1 - e^{-K_\lambda s})}{\pi(\exp(C_2/\lambda T) - 1)}$$

wherein $I_{n,\lambda}$ and $I_{n+1,\lambda}$ are first and second intensity values at a wavelength $\lambda$, s is the distance between said first and second positions, $K_\lambda$ is the total local absorption coefficient of the gas at the wavelength $\lambda$, T is the local temperature, and $C_1$ and $C_2$ are first and second radiation constants; wherein $K_\lambda$ is given by $$K_\lambda = v_i C_i K_{\lambda,i}$$

in which $C_i$ is the local proportional fraction of a component species i in the gas, and $K_{\lambda,i}$ is the absorption coefficient of that species at the wavelength $\lambda$; and whereby a set of simultaneous equations is generated and is solved to calculate a value for the local gas temperature.

7. A device according to claim 6, wherein the data processing means solves the set of simultaneous equations to give values of $C_i$ as well as T.

8. Apparatus according to claim 6, wherein the probe means comprises an elongate radiation transmitting member, at least one end of which is movable by the drive means for moving the probe means and the opposite end of which is in radiation transmitting relationship with a plurality of radiation sensors, each one of which is sensitive to a different wavelength, said data acquisition means taking an intensity measurement from each of the sensors substantially simultaneously.

9. Apparatus according to claim 8, wherein the plurality of sensors are arranged generally circumferentially around the end of the radiation transmitting member, and a further member having a reflecting surface is positioned at said opposite end of the transmitting member to reflect radiation from the member in a plurality of generally radial directions towards the sensors.

10. Apparatus according to claim 9, wherein said further member providing said reflecting surface comprises a prism.

* * * * *